US007283032B2

(12) United States Patent
Inoue et al.

(10) Patent No.: US 7,283,032 B2
(45) Date of Patent: Oct. 16, 2007

(54) STATIC ELECTRICITY COUNTERMEASURE COMPONENT

(75) Inventors: Tatsuya Inoue, Osaka (JP); Hidenori Katsumura, Hyogo (JP); Hiroshi Kagata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 103 days.

(21) Appl. No.: 10/552,353

(22) PCT Filed: Mar. 10, 2005

(86) PCT No.: PCT/JP2005/004186

§ 371 (c)(1),
(2), (4) Date: Oct. 7, 2005

(87) PCT Pub. No.: WO2005/088654

PCT Pub. Date: Sep. 22, 2005

(65) Prior Publication Data

US 2006/0227473 A1 Oct. 12, 2006

(30) Foreign Application Priority Data

Mar. 15, 2004 (JP) ............................ 2004-072562

(51) Int. Cl.
*H01C 7/10* (2006.01)
*H02H 1/00* (2006.01)

(52) U.S. Cl. ........................................ 338/21; 361/127

(58) Field of Classification Search ................ 361/119, 361/127; 338/21
See application file for complete search history.

(56) References Cited

U.S. PATENT DOCUMENTS 5,034,709 A * 7/1991 Azumi et al. ............... 333/184
2005/0195549 A1* 9/2005 Inoue et al. ................ 361/118

FOREIGN PATENT DOCUMENTS

JP 58-85502 A 5/1983
JP 7-33514 A 2/1995
JP 8-31616 A 2/1996
JP 11-251152 A 9/1999

* cited by examiner

*Primary Examiner*—Ronald W. Leja
(74) *Attorney, Agent, or Firm*—McDermott Will & Emery LLP

(57) ABSTRACT

It is possible to realize an electrostatic discharge protection component having a very small electrostatic capacity suited to a high-frequency equipment and comprising a ceramic insulating substrate, a varistor unit composed of a varistor layer and an internal electrode, which are sintered and integrated on the ceramic insulating substrate, and at least a pair of external electrodes provided on the varistor unit, the varistor unit being formed with a varistor.

7 Claims, 5 Drawing Sheets

STATIC ELECTRICITY COUNTERMEASURE COMPONENT

RELATED APPLICATION

This application is the U.S. National Phase under 35 U.S.C. § 371 of International Application No. PCT/JP2005/04186, filed Mar. 10, 2005, which in turn claims the benefit of Japanese Application No. 2004-072562, filed Mar. 15, 2004, the disclosures of which Applications are incorporated by reference herein in their entirety.

TECHNICAL FIELD

The present invention relates to an electrostatic discharge protection component that protects an electronic equipment from electrostatic discharge.

BACKGROUND ART

In recent years, miniaturization and high-performance in an electronic equipment such as portable telephones, etc. have been rapidly advanced, and keeping with this, an electric circuit in an electronic equipment has been made high packaging density and decreased in withstand voltage. Therefore, there has been increased damage to an electric circuit in an equipment, which is caused by electrostatic discharge pulse generated when the human body and terminals of the electronic equipment contact with each other.

Conventionally, as measures to prevent such damage caused by electrostatic discharge pulse, a method has been carried out to provide a multilayer chip varistor, etc. between the incoming line of electrostatic discharge pulse and the ground so as to bypass the electrostatic discharge to reduce voltage applied to an electric circuit of an electronic equipment.

For example, JP-A-8-31616 is known as prior art document information related to conventional multilayer chip varistors used in measures against electrostatic discharge pulse.

Recently, keeping with high-performance in an electronic equipment, clock frequency, at which an electronic equipment is operated, is increasingly made high. As a result, electronic parts such as the electrostatic discharge protection components have demanded a small electrostatic capacity that has no influence on clock frequency. Frequency for transmission and reception in portable telephones, etc. is as high as 800 MHz to 2 GHz, and electrostatic discharge protection components corresponding to this requires a small electrostatic capacity.

Since a zinc oxide material constituting conventional multilayer chip varistors has a dielectric constant in the order of several hundreds to one thousand and several hundreds, however, it is difficult to realize electrostatic capacity of at most 1 pF with stray capacitance. In case of, for example, a conventional multilayer chip varistor sized to conventionally have a length of 1.0 mm and a width of 0.5 mm, a minimum electrostatic capacity thereof is around 3 pF, a cutoff frequency thereof is in the order of about 1 GHz, and a resonant frequency thereof is about 1.8 GHz. Accordingly, use at a high frequency over 1 GHz is not possible.

The invention has been thought of in view of the problem and has its object to provide an electrostatic discharge protection component having a very small electrostatic capacity.

DISCLOSURE OF THE INVENTION

In order to achieve the aforementioned the object, an electrostatic discharge protection component according to the invention comprises a ceramic insulating substrate, a varistor unit composed of a varistor layer and an internal electrode, which are sintered and integrated on the ceramic insulating substrate, and at least a pair of external electrodes provided on the varistor unit, the varistor unit being formed with a varistor.

Thereby, a material having a lower dielectric constant than that of the varistor layer can be optionally set for the ceramic insulating substrate. Accordingly, it is possible to decrease a stray capacitance for an electrostatic discharge protection component to realize an electrostatic discharge protection component having a very small electrostatic capacity.

In the structure, the external electrodes may be provided to be sintered and integrated on the same surface of the varistor unit. Thereby, it is possible to decrease the external electrodes in area and to decrease a stray capacitance. As a result, it is possible to obtain an electrostatic discharge protection component, of which electrostatic capacity can be decreased.

In the structure, the ceramic insulating substrate is desirably two or more times as thick as the varistor unit. Thereby, in the case where the varistor unit and the ceramic insulating substrate are sintered and integrated, warpage can be made to a level to cause no practical problem.

In the structure, the varistor layer may be made of a varistor material mainly composed of zinc oxide and the ceramic insulating substrate may be an alumina substrate with a copper oxide content of not more than 0.1% by weight ratio. Thereby, since the ceramic insulating substrate has a decreased content of copper oxide being a substance that inhibits realization of characteristics of a zinc oxide varistor, it is possible to prevent diffusion of copper oxide into the varistor layer from the alumina substrate when sintered. Accordingly, it is possible to more surely realize varistor characteristics with good reproducibility, thus enabling to obtain an electrostatic discharge protection component having further stable characteristics.

In the structure, a protective film is desirably formed on an upper surface of the varistor unit except a region, in which the external electrodes are formed. Thereby, a plating film can be easily formed on the external electrodes and thus an electrostatic discharge protection component having a further excellent quality of mounting is obtained.

In the structure, the ceramic insulating substrate may have a built-in inductor and the inductor may be connected electrically to the varistor of the varistor unit. Thereby, since an inductor function as well as a varistor function is added, it is possible to add a filter function. As a result, the effect of reducing electrostatic discharge can be further improved, so that it is possible to realize an excellent electrostatic discharge protection component.

The structure includes two varistors and a $\pi$ ahaped filter configuration may be constructed by the varistors and the inductor. Alternatively, the varistor and the inductor may be provided in plural to construct a multi-stage low-pass filter.

Since such provision of the varistor and the inductor in plural makes it possible to realize various filter circuits, it is possible to realize an electrostatic discharge protection component being further excellent in the effect of reducing electrostatic discharge.

Since an electrostatic discharge protection component according to the invention can be made very small in electrostatic capacity, it can protect a high-frequency electronic equipment from damage caused by electrostatic discharge pulse without any influence on the operation of even an electronic equipment that operates at a high clock frequency.

DESCRIPTION OF REFERENCE NUMERALS AND SIGNS

Figure 1:
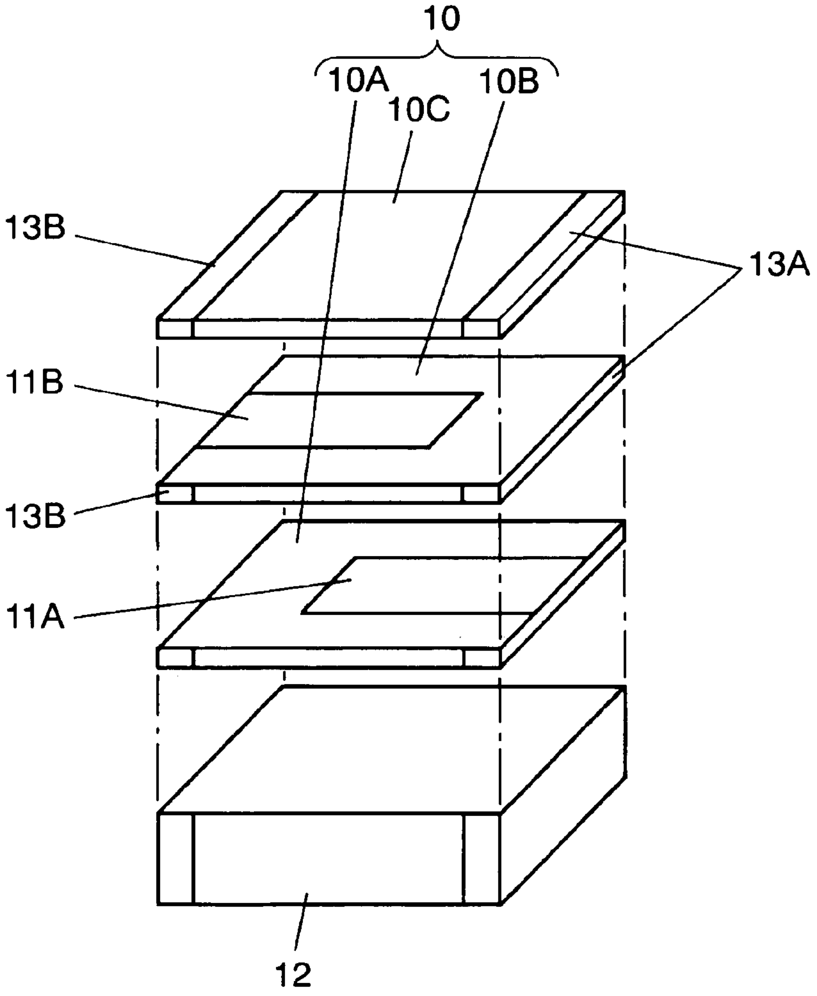
FIG. 1 is a schematic, exploded, perspective view showing an electrostatic discharge protection component according to a first embodiment of the invention.

10, 50, 70: varistor unit
10A, 10B, 10C, 10D, 10E, 10F, 10G, 10H: varistor layer
11A, 11B, 11C, 11D, 11E, 11F: internal electrode
12: ceramic insulating substrate
13A, 13B, 14A, 14B: external electrode
15A: external electrode for grounding
15B: input external electrode
15C: output external electrode
17: viahole embedded conductor
18: protective film
19: inductor conductor
20: glass/ceramic substrate (ceramic insulating substrate)
20A, 20B, 20C: glass/ceramic layer
101: dc power source
102, 106: resistor
103, 105: switch
104: capacity box
107: ground line
108: signal line
109: evaluation sample
110: protected equipment
201: varistor
202: input-output external electrode
203: external electrode for grounding
204: input external electrode
205: output external electrode
206: inductor

DETAILED DESCRIPTION OF PREFERRED EMBODIMENTS

Electrostatic discharge protection component according to embodiments of the invention will be described below in detail with reference to the drawings. In addition, the same elements are denoted by the same reference numerals and an explanation thereof is sometimes omitted.

First Embodiment

Figure 2:
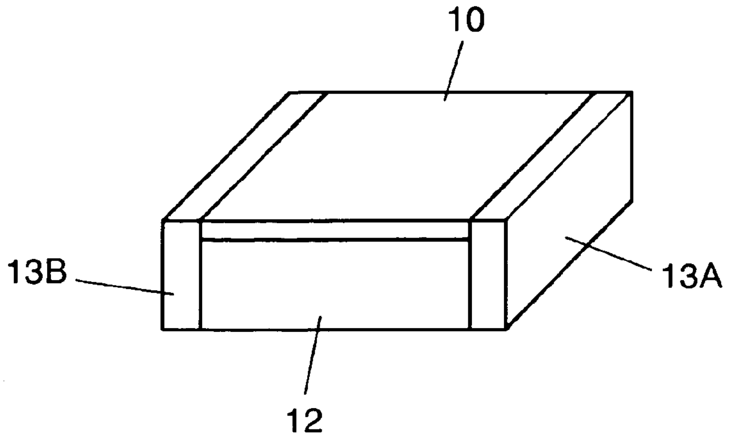
FIG. 2 is a perspective view showing an outward appearance of the electrostatic discharge protection component according to the embodiment.
Figure 3:
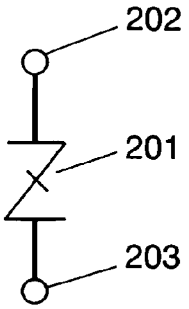
FIG. 3 is an equivalent circuit diagram of the electrostatic discharge protection component according to the embodiment.

FIG. 1 is a schematic, exploded, perspective view showing an electrostatic discharge protection component according to a first embodiment of the invention. FIG. 2 is a perspective view showing an outward appearance of the electrostatic discharge protection component. FIG. 3 is an equivalent circuit diagram of the electrostatic discharge protection component.

As shown in FIGS. 1 and 2, the electrostatic discharge protection component according to the embodiment includes varistor layers 10A, 10B, 10C and internal electrodes 11A, 11B alternately laminated on ceramic insulating substrate 12, and a pair of external electrodes 13A, 13B provided on a ceramic sintered body formed by integrating the varistor layers and the internal electrodes. After varistor layer 10A is formed, internal electrode 11A is formed in a position as shown on varistor layer 10A. Thereafter, varistor layer 10B is laminated, internal electrode 11B is formed in a predetermined position on varistor layer 10B, varistor layer 10C is laminated thereon, and these elements are stuck to ceramic insulating substrate 12 to be sintered to form the ceramic sintered body.

Internal electrode 11A is taken to one end of the ceramic sintered body to be electrically connected to external electrode 13A. Internal electrode 11B is taken to the other end of the ceramic sintered body to be electrically connected to external electrode 13B.

FIG. 3 is an equivalent circuit diagram of the electrostatic discharge protection component, according to the embodiment, thus constructed. The equivalent circuit includes varistor 201 being the electrostatic discharge protection component according to the embodiment, input-output external electrode 202, and external electrode 203 for grounding. With the electrostatic discharge protection component according to the embodiment, external electrodes 13A, 13B have the same structure in terms of an equivalent circuit as described above. Accordingly, when being actually connected to the circuit to be used, one of external electrodes 13A, 13B serves as input-output external electrode 202, and the other serves as external electrode 203 for grounding.

With the electrostatic discharge protection component according to the embodiment, varistor unit 10 provided with varistor layers 10A, 10B, 10C, internal electrodes 11A, 11B, and external electrodes 13A, 13B is stuck to ceramic insulating substrate 12 and baked to be sintered and integrated to form a ceramic sintered body. When a material having a lower dielectric constant than those of materials of varistor layers 10A, 10B, 10C is selected as a material for ceramic insulating substrate 12, an electrostatic discharge protection component can be reduced in stray capacitance. Since an electrostatic capacity can be made very small, it is possible to realize an electrostatic discharge protection component applicable to an electric circuit having a very high clock frequency.

A method of manufacturing an electrostatic discharge protection component according to the embodiment will be described below with reference to FIGS. 1 and 2.

First, a zinc oxide raw sheet containing ceramic powder having zinc oxide as a main component, and an organic binder was fabricated and prepared. At this time, the zinc oxide raw sheet had a thickness of about 30 μm.

First, a conductor paste having silver particle as a main component is used to form a conductor layer, which will make internal electrode 11A, on the zinc oxide raw sheet with screen printing. Further, a zinc oxide raw sheet is laminated thereon. Subsequently, the same conductor paste as that described above is likewise used to form a conductor layer, which will make internal electrode 11B, on the zinc oxide raw sheet with screen printing. Further, a zinc oxide raw sheet is laminated thereon to form a laminated body.

Subsequently, an alumina substrate is used for ceramic insulating substrate 12, and the laminated body is stuck to the alumina substrate to provide a laminated body block. The alumina substrate being ceramic insulating substrate 12 had a thickness of about 250 μm and the conductor layers being internal electrodes 11A, 11B had a thickness of about 2.5 μm.

According to the embodiment, a plurality of electrostatic discharge protection components are fabricated on the alumina substrate. Therefore, printed patterns of the conductor layers have a multiplicity of configurations, shown in FIGS. 1 and 2, on the zinc oxide raw sheet. Thereby, after being cut, a multiplicity of electrostatic discharge protection components having the configurations shown in FIG. 2 can be fabricated at a time.

Subsequently, the laminated body block is heated in the atmosphere for a removing the binder. After the treatment, the laminated body block is further heated in the atmosphere to 930° C. to be sintered, thus providing an integral sintered body.

Subsequently, the sintered body is cut to a predetermined dimension to be separated into individual pieces. Thereby, it is possible to obtain a ceramic sintered body in a state before an electrostatic discharge protection component, shown in FIGS. 1 and 2, according to the embodiment is made, that is, before external electrodes 13A, 13B are formed.

Succeedingly, a conductor paste having silver particle as a main component is applied to both ends on major sides of the ceramic sintered body, and thereafter sintered at 800° C. to form external electrodes 13A, 13B. According to the method, an electrostatic discharge protection component, shown in FIGS. 1 and 2, according to the embodiment is obtained.

The electrostatic discharge protection component as fabricated has a lengthwise dimension of about 1.0 mm, a widthwise dimension of about 0.5 mm, and a thicknesswise dimension of about 0.3 mm. An electrostatic capacity between external electrodes 13A, 13B was 1 pF, and $V_{1\ mA}$=27 V was obtained when varistor voltage was $V_{1\ mA}$ (voltage when current of 1 mA flows).

For the purpose of comparison, a multilayer chip varistor was fabricated, of which dimensions of internal electrodes, outside dimensions, and a zinc oxide raw sheet were the same as those of the electrostatic discharge protection component according to the embodiment, and for which varistor voltage was $V_{1\ mA}$=27 V. The multilayer chip varistor was about 3 pF in electrostatic capacity.

Figure 10:
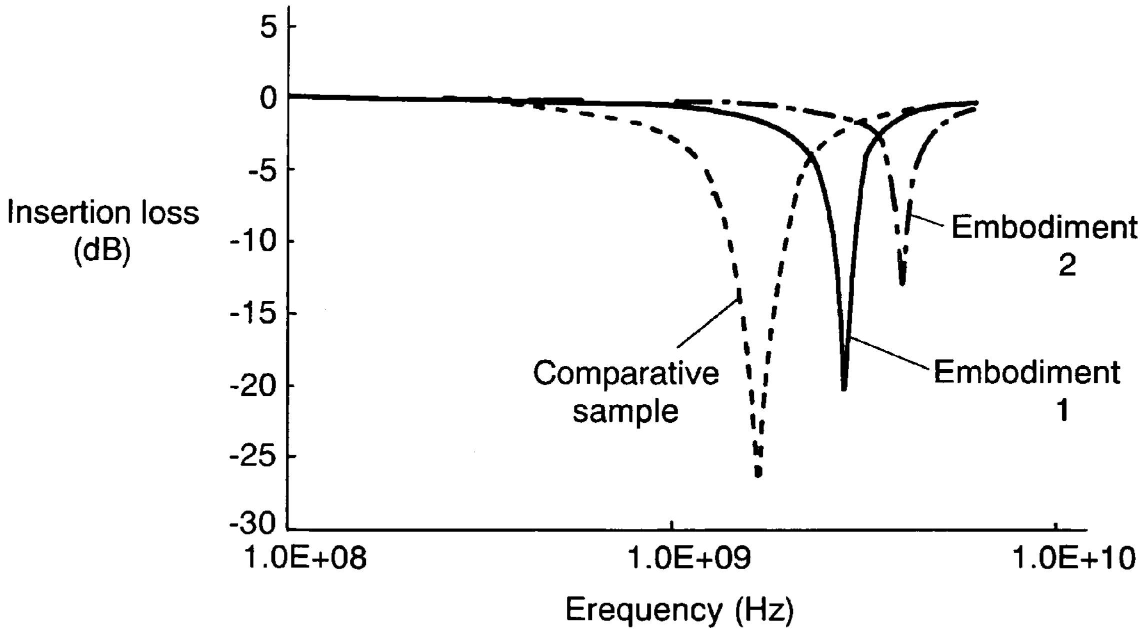
FIG. 10 is a view illustrating results of evaluation of frequency characteristics of the electrostatic discharge protection components according to the first and second embodiments of the invention.

Frequency characteristics were evaluated with respect to the electrostatic discharge protection component according to the embodiment (referred below to as embodiment 1) and a multilayer chip varistor (referred below to as comparative example) fabricated for the purpose of comparison. FIG. 10 is a view illustrating results of evaluation of frequency characteristics. An axis of ordinates indicates insertion loss while an axis of abscissas indicates frequency. As shown in FIG. 10, the embodiment 1 gave a resonance frequency having a high value as compared with a resonance frequency of the comparative example, of which electrostatic capacity was 3 pF. Thus the embodiment 1 gave a resonance frequency of 2.8 GHz. As a result, it was found that the embodiment was usable even for frequency over 1 GHz. Accordingly, it was possible to obtain an electrostatic discharge protection component suited to use at high frequencies.

Subsequently, the embodiment 1 and the comparative example were put to electrostatic discharge pulse test to be evaluated.

Figure 4:
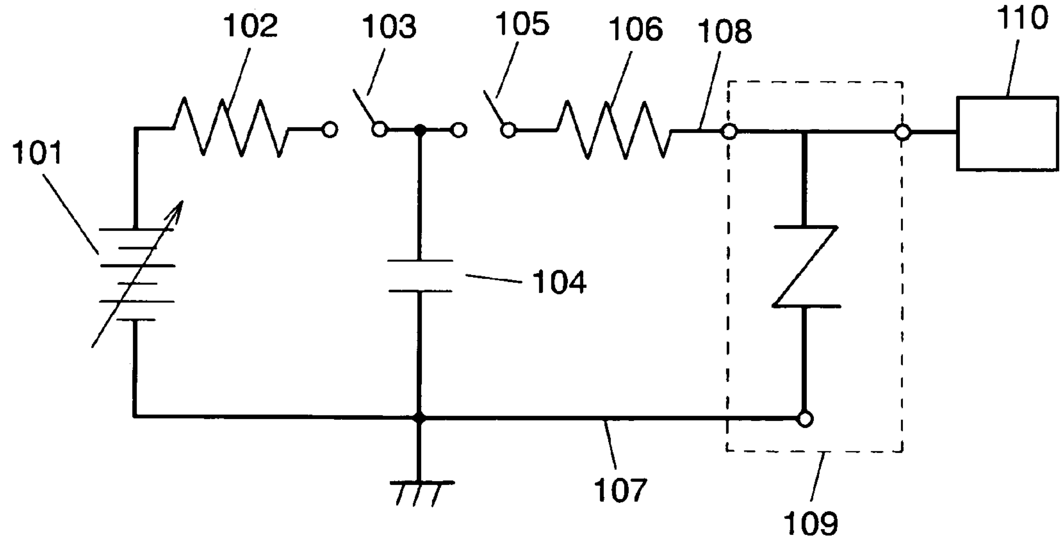
FIG. 4 is a test circuit diagram used in electrostatic discharge pulse test of the electrostatic discharge protection component according to the embodiment.

FIG. 4 is a test circuit block diagram used in electrostatic discharge pulse test of the electrostatic discharge protection component. In the test circuit, switch 103 is turned on to permit dc power source 101 to apply a predetermined voltage through resistor 102 to charge capacity box 104 (electrostatic capacity: 150 pF) with electric charge. Subsequently, the switch is changed. That is, switch 103 is turned off and switch 105 is turned on. Thereby, electric charge charged in capacity box 104 is applied as electrostatic discharge pulse to protected equipment 110 via resistor 106 through signal line 108.

As for evaluation of the embodiment 1, the embodiment 1 was arranged in a position corresponding to an evaluation sample 109 shown in FIG. 4, input-output external electrode 202 was connected to signal line 108, and external electrode 203 for grounding was connected to ground line 107.

Voltage waveform between signal line 108 and ground line 107 that are disposed immediately before protected equipment 110 when electrostatic discharge pulse was applied was measured. Owing to bypassing of electrostatic discharge pulse, the measurement makes it possible to evaluate an effect of reduction on voltage applied to protected equipment 110, that is, an effect of absorption and reduction on electrostatic discharge pulse by the embodiment 1 being evaluation sample 109.

For the purpose of comparison, an effect of absorption and reduction on electrostatic discharge pulse was also evaluated in the case where the comparative example, of which electrostatic capacity was 3 pF and for which varistor voltage was $V_{1\ mA}$=27 V, was likewise arranged in a position corresponding to evaluation sample 109 and connected between signal line 108 and ground line 107. An effect of absorption and reduction was confirmed by comparison of peak voltage values of electrostatic discharge pulses when 8 kV was applied by the electrostatic discharge pulse test circuit shown in FIG. 4.

In the case where the comparative example was connected between signal line 108 and ground line 107, a peak voltage value applied to protected equipment 110 was about 220 V. In contrast, in the case where the embodiment 1 was connected, a peak voltage value applied to protected equipment 110 was about 230 V. Thus, although the respective structures were quite different from each other, it was found that an effect of absorption and reduction on electrostatic discharge pulse changed little from that of conventional multilayer chip varistors. Further, the embodiment 1 makes it possible to make its electrostatic capacity ⅓ as large as that of conventional multilayer chip varistors since alumina having a dielectric constant in the order of 10 occupies a major part of a volume of the part.

For the electrostatic discharge protection component according to the embodiment, it was examined to fabricate samples, in which the number of lamination in varistor unit 10 was increased and a thickness of varistor unit 10 after sintering was larger than ½ of a thickness 250 μm of the alumina substrate being ceramic insulating substrate 12, that is, equal to or larger than about 130 μm. However, such samples generated warpage after sintering and so practical ones as the electrostatic discharge protection component were not obtained. On the other hand, in the case where a thickness of ½ or smaller as large as that of the alumina substrate was adopted in the same manner as in the embodiment, it was found that warpage could be restricted to a level to cause no practical problem. Accordingly, it is preferable that a thickness of ceramic insulating substrate 12 be twice or larger than a thickness of varistor unit 10.

As ceramic insulating substrate 12 for the electrostatic discharge protection component according to the embodiment, samples making use of an alumina substrate, of which copper oxide had a content in excess of 0.1 wt. %, were fabricated and evaluated with respect to characteristics. In case of samples fabricated by the use of the alumina substrate, it was found that a peak voltage value of electrostatic discharge pulse was about 400 kV when 8 kV was applied by the electrostatic discharge pulse test circuit shown in FIG. 4. On the other hand, samples making use of various alumina substrates, of which copper oxide had a content of at most 0.1 wt. %, were fabricated and evaluated with respect to characteristics, as described in the embodiment. The same effect as that in the embodiment 1 was obtained in all these samples. Accordingly, it was confirmed that when an alumina substrate, of which copper oxide had a content in excess of 0.1 wt. %, was used,. an effect of absorption and reduction on electrostatic discharge pulse is worsened. From the above results, it was found that alumina substrate, of which copper oxide had a content of at most 0.1 wt. %, were desirable.

Second Embodiment

Figure 5:
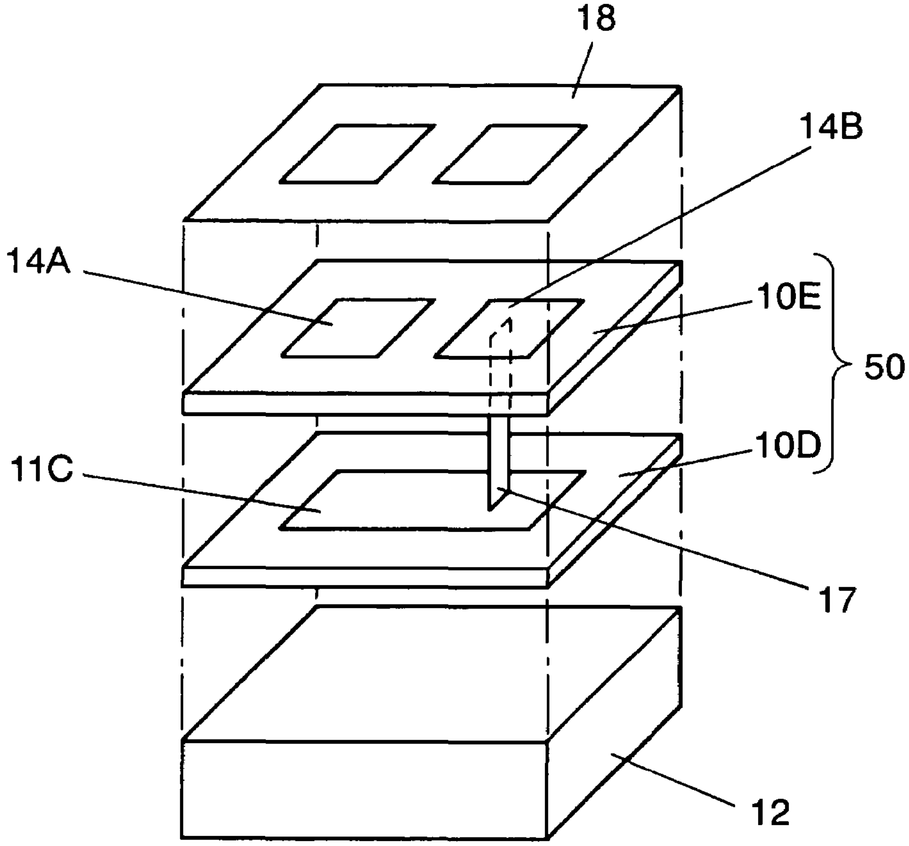
FIG. 5 is a schematic, exploded, perspective view showing an electrostatic discharge protection component according to a second embodiment of the invention.
Figure 6:
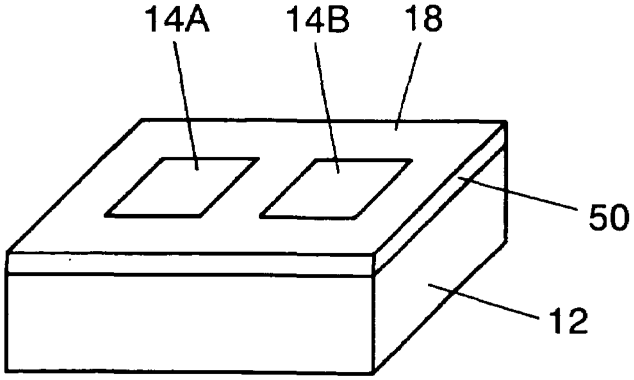
FIG. 6 is a perspective view showing an outward appearance of the electrostatic discharge protection component according to the embodiment.

FIG. 5 is a schematic, exploded, perspective view showing an electrostatic discharge protection component according to a second embodiment of the invention. FIG. 6 is a perspective view showing an outward appearance of the electrostatic discharge protection component. In addition, an equivalent circuit diagram of the electrostatic discharge protection component according to the embodiment is the same as that shown in FIG. 3 and illustrated with respect to the electrostatic discharge protection component according to the first embodiment.

As shown in FIGS. 5 and 6, the electrostatic discharge protection component according to the embodiment includes varistor unit 50, external electrodes 14A, 14B, and protective film 18, which are formed on ceramic insulating substrate 12. Varistor layers 10D, 10E, internal electrode 11C, and external electrodes 14A, 14B are laminated to make varistor unit 50, and this varistor unit 50 is stuck to ceramic insulating substrate 12 to be sintered to make an integral ceramic sintered body. External electrodes 14A, 14B are provided on a surface of varistor unit 50 of the ceramic sintered body. Internal electrode 11C is connected electrically to external electrode 14B through viahole embedded conductor 17. An upper surface of varistor unit 50 except regions, in which external electrodes 14A, 14B are formed, is covered by protective film 18.

The electrostatic discharge protection component, according to the embodiment, constructed in the manner described above is the same as the equivalent circuit shown in FIG. 3. That is, the equivalent circuit in the embodiment includes varistor 201 being the electrostatic discharge protection component according to the embodiment, input-output external electrode 202, and external electrode 203 for grounding. As described above, external electrodes 14A, 14B have the same structure in terms of an equivalent circuit. Accordingly, when being actually connected to the circuit to be used, one of the external electrodes serves as input-output external electrode 202, and the other serves as external electrode 203 for grounding.

As described above, with the electrostatic discharge protection component according to the embodiment, varistor unit 50 provided with varistor layers 10D, 10E, internal electrode 11C, and external electrodes 14A, 14B is stuck to ceramic insulating substrate 12 to be sintered and integrated to form a ceramic sintered body. In this case, a material having a lower dielectric constant than those of materials of varistor layers 10D, 10E is selected for ceramic insulating substrate 12 whereby an electrostatic discharge protection component can be reduced in stray capacitance and made very small in electrostatic capacity. Thereby, it is possible to realize an electrostatic discharge protection component applicable to an electric circuit having a very high-speed clock frequency.

Further, with the electrostatic discharge protection component according to the embodiment, external electrodes 14A, 14B are specifically provided on the same surface, so that external electrodes 14A, 14B can be made further small in area as compared with the electrostatic discharge protection component according to the first embodiment. Further, internal electrode 11C can be also made small in area. Thereby, electrostatic capacity-can be made small. Accordingly, the electrostatic discharge protection component according to the embodiment is also applicable to an electric circuit having a further high-speed clock frequency. Since external electrodes 14A, 14B for connection to a circuit board are provided on the same surface, it is possible to achieve making a circuit small in size, high in density, and thin when being mounted to the circuit board to form a circuit. Further, mounting can be reduced in cost.

Further, with the electrostatic discharge protection component according to the embodiment, internal electrode 11C is connected electrically to external electrode 14B through viahole embedded conductor 17. Thereby, a manufacturing process can be further simplified since a process for formation of external electrodes as in the first embodiment can be dispensed with.

An upper surface of varistor unit 50 except regions, in which external electrodes 14A, 14B are formed, is covered by protective film 18. Thereby, a plating film can be readily formed on external electrodes 14A, 14B, so that it is possible to obtain an electrostatic discharge protection component being excellent in certainty and reliability of mounting. Nickel (Ni) and solder are formed as a plating film. However, gold (Au), copper (Cu), silver (Ag), etc. may be used instead of solder.

A method of manufacturing an electrostatic discharge protection component according to the embodiment will be described below with reference to FIGS. 5 and 6.

First, a zinc oxide raw sheet containing ceramic powder having zinc oxide as a main component, and an organic binder is fabricated and prepared. At this time, the raw sheet had a thickness of about 30 μm.

A conductor paste having silver particle as a main component is used to form a conductor layer, which will make internal electrode 11C, on the zinc oxide raw sheet with, for example, screen printing. A zinc oxide raw sheet filled with a conductor paste, which will make viahole embedded conductor 17, is laminated in a position, which is above the conductor layer and connected electrically to external electrode 142. The zinc oxide raw sheet will make varistor layer 10E after being sintered.

Subsequently, a conductor paste is used to form a conductor layer, which will make external electrodes 14A, 14B, on a top of the zinc oxide raw sheet, which will make varistor layer 10E, with, for example, screen printing. Thereby, a laminated body, which will make varistor unit 50, is obtained.

Subsequently, an alumina substrate is used for ceramic insulating substrate 12, and the laminated body is stuck to the alumina substrate to provide a laminated body block.

According to the embodiment, the alumina substrate had a thickness of about 250 μm and the conductor layer had a thickness of about 2.5 μm. According to the embodiment, a plurality of electrostatic discharge protection components are fabricated on the alumina substrate. Therefore, printed patterns of the conductor layers have a multiplicity of configurations, shown in FIGS. 5 and 6, on the zinc oxide raw sheet. Thereby, after being cut, a multiplicity of electrostatic discharge protection components having the configurations shown in FIG. 6 can be fabricated at a time.

Subsequently, the laminated body block is heated in the atmosphere for removing the binder. Thereafter, the laminated body block is further heated in the atmosphere to 930° C. to be sintered, thus fabricating an integral sintered body. Thereafter, protective film 18 is formed on a surface of varistor unit 50 except regions, in which external electrodes 14A, 14B are formed. Protective film 18 is formed by using a thermosetting resin paste with screen printing and curing the thermosetting resin at a predetermined temperature.

Succeedingly, double-layer plating composed of nickel (Ni) and solder is formed on surfaces of external electrodes 14A, 14B of the sintered body formed with protective film 18. Thereafter, the sintered body is cut to and separated into a predetermined dimension. Thereby, it is possible to obtain an electrostatic discharge protection component, shown in FIGS. 5 and 6, according to the embodiment.

The electrostatic discharge protection component, according to the embodiment, as fabricated had a lengthwise dimension of about 1.0 mm, a widthwise dimension of about 0.5 mm, and a thicknesswise dimension of about 0.3 mm. An electrostatic capacity between external electrodes 14A, 14B was 0.4 pF, and $V_{1\ mA}$=27 V of varistor voltage was obtained. The electrostatic discharge protection component thus fabricated is referred below to as embodiment 2.

Frequency characteristics were evaluated with respect to the embodiment 2, which is the electrostatic discharge protection component according to the embodiment. FIG. 10 illustrates results of evaluation of frequency characteristics. As shown in FIG. 10, the embodiment 2 gave a resonance frequency having a value as high as 4 GHz as compared with the comparative example and the embodiment 1. Accordingly, in the embodiment 2 an electrostatic discharge protection component, which is usable even for frequency over 2 GHz and usable at higher frequencies is available.

Subsequently, the embodiment 2 was put to electrostatic discharge pulse test to be evaluated.

In the evaluation of the electrostatic discharge pulse test, the embodiment 2 was used as evaluation sample 109 shown in FIG. 4 in the same manner as in the electrostatic discharge pulse test described in the first embodiment, input-output external electrode 202 of varistor 201 being the embodiment 2 was connected to signal line 108, and external electrode 203 for grounding was connected to ground line 107. In a state thus connected, voltage of 8 kV of applied electrostatic discharge pulse was applied by the circuit shown in FIG. 4, a peak voltage value of electrostatic discharge pulse applied on protected equipment 110 was measured, and an effect of reduction of the voltage was evaluated.

In case of the provision of the embodiment 2, a peak voltage value applied on protected equipment 110 was about 230 V. As a result, it was found that the embodiment 2 adequately produced an effect of absorption and reduction on electrostatic discharge pulse. Further, by making internal electrode 11C and external electrodes 14A, 14B small in area, the embodiment 2 enables reduction in stray capacitance. Therefore, electrostatic capacity can be made ½ or less as compared with the embodiment 1.

While protective film 18 is formed on the electrostatic discharge protection component according to the embodiment, it was found that when double-layer plating composed of nickel and solder is made without formation of protective film 18, several regions except external electrodes 14A, 14B are plated. So, it results in a very poor yield.

While the electrostatic discharge protection component according to the embodiment uses a resin paste for formation of the protective film, a protective film sintered with use of glass paste will do. Alternatively, glass paste may be sintered and formed integrally together with varistor unit 50.

Third Embodiment

Figure 7:
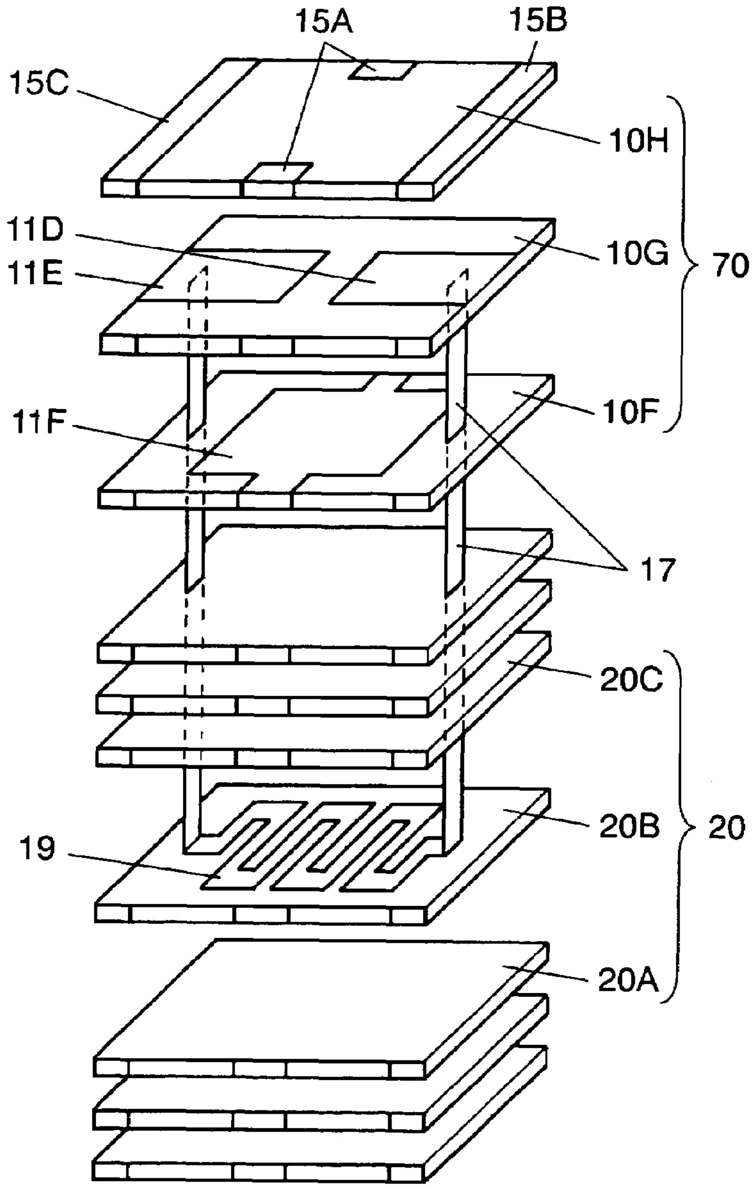
FIG. 7 is a schematic, exploded, perspective view showing an electrostatic discharge protection component according to a third embodiment of the invention.
Figure 8:
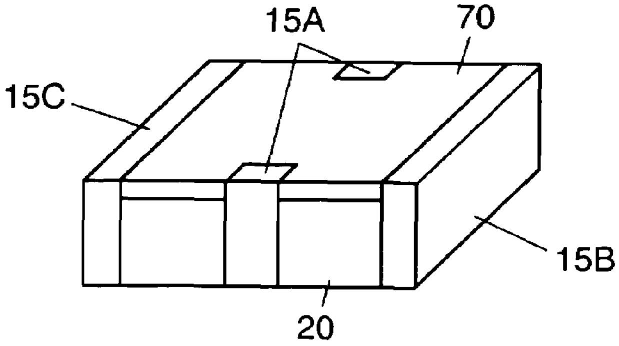
FIG. 8 is a perspective view showing an outward appearance of the electrostatic discharge protection component according to the embodiment.
Figure 9:
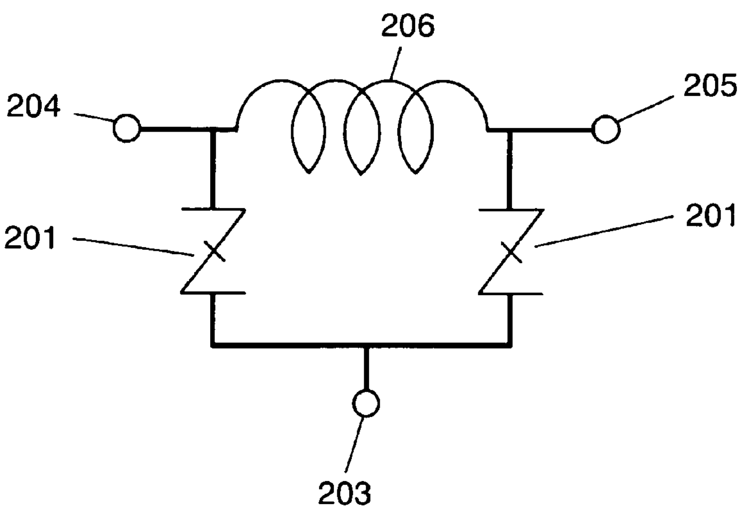
FIG. 9 is an equivalent circuit diagram of the electrostatic discharge protection component according to the embodiment.

FIG. 7 is a schematic, exploded, perspective view showing an electrostatic discharge protection component according to a third embodiment of the invention. FIG. 8 is a perspective view showing an outward appearance of the electrostatic discharge protection component. FIG. 9 is an equivalent circuit diagram of the electrostatic discharge protection component.

As shown in FIGS. 7 and 8, the electrostatic discharge protection component according to the embodiment includes varistor unit 70, glass/ceramic substrate 20 with an internal inductor, external electrode 15A for grounding, input external electrode 15B, and output external electrode 15C. According to the embodiment, the glass/ceramic substrate corresponds to a ceramic insulating substrate referred to in the invention. In the following descriptions, the glass/ceramic substrate is described as ceramic insulating substrate 20 or glass/ceramic substrate 20.

Varistor unit 70 includes varistor layers 10F, 10G, 10H and internal electrodes 11D, 11E, 11F which are laminated. Glass/ceramic substrate 20 includes glass/ceramic layers 20A, 20B, 20C and inductor conductor 19 formed on glass/ceramic layer 20B, and is constructed with glass/ceramic layers 20A, 20B, 20C laminated.

Varistor unit 70 is provided on glass/ceramic substrate 20, in which an inductor is built-in. Internal electrode 11*d* and inductor conductor 19, and internal electrode 11E and inductor conductor 19, respectively, are connected electrically through respective viahole embedded conductors 17. After being laminated, these elements are sintered and integrated to provide a ceramic sintered body, and external electrode 15A for grounding, input external electrode 15B, and output external electrode 15C are provided on the ceramic sintered body.

Internal electrode 11F is extended to both ends of short sides of the ceramic sintered body to be connected electrically to external electrode 15A for grounding. Internal electrode 11D is extended to one end of its long side to be connected electrically to input external electrode 15B. Internal electrode 11E is extended to the other end of the long side to be connected electrically to output external electrode 15C.

FIG. 9 is a view showing an equivalent circuit of the electrostatic discharge protection component according to the embodiment. As shown in FIG. 9, two varistors 201 in the electrostatic discharge protection component according to the embodiment are connected in parallel to inductor 206. Two varistors 201 are connected to external electrode 203 for grounding, input external electrode 204, and output external electrode 205, respectively, in a manner shown. Inductor 206 is provided between input external electrode 204 and output external electrode 205.

As described above, input external electrode 15B and output external electrode 15C in the electrostatic discharge protection component according to the embodiment have the same structure in terms of an equivalent circuit. Accordingly, when being actually connected to the circuit to be used, one of the electrodes serves as input external electrode 204, and the other serves as output external electrode 205. Two varistors 201 in the electrostatic discharge protection component according to the embodiment include internal electrodes 11D, 11F shown in FIG. 7 and varistor layer 10G interposed by the internal electrodes, and internal electrodes 11E, 11F and varistor layer 10G interposed by the internal electrodes, respectively. Inductor 206 is mainly composed of inductor conductor 19.

As described above, the electrostatic discharge protection component according to the embodiment uses a glass/ceramic substrate having a lower dielectric constant than those of materials of varistor layers like the electrostatic discharge protection components according to the first and second embodiments. Accordingly, the electrostatic discharge protection component can be reduced in in stray capacitance. As a result, it is possible to obtain an electrostatic discharge protection component having a very small electrostatic capacity.

The electrostatic discharge protection component according to the embodiment uses, as glass/ceramic substrate 20, a glass/ceramic substrate, in which an inductor is built-in. Further, internal electrodes 11d, 11E and inductor conductor 19, respectively, are connected through viahole embedded conductors 17. The connection provides a structure, in which two varistors and an inductor are coupled in a π-shaped manner. Thereby, it is possible to obtain an electrostatic discharge protection component having a further excellent filtering function.

Subsequently, a method of manufacturing an electrostatic discharge protection component according to the embodiment will be described with reference to FIGS. 7 and 8.

First, a glass/ceramic raw sheet containing glass/ceramic powder having borosilicate glass and alumina as a main component, and an organic binder is fabricated and prepared. At this time, the glass/ceramic raw sheet had a thickness of about 30 μm.

Subsequently, a plurality (for sheets in FIG. 7) of the glass/ceramic raw sheets are laminated on one another. A conductor paste containing silver particle as a main component is used to form a conductor layer, which will make inductor conductor 19, on that uppermost raw sheet among the laminated raw sheets, which will make glass/ceramic layer 20B after sintering, with, for example, screen printing.

Laminated thereon are a plurality (three in FIG. 7) of glass/ceramic raw sheets with a conductor paste, which will make viahole embedded conductors 17, filled in positions connected electrically to both ends of a conductor layer, which will make inductor conductor 19, and conductor layers, which will make internal electrodes 11D, 11E, respectively. These glass/ceramic raw sheets make glass/ceramic layer 20C after sintering.

The laminated body constructed in this manner is heated in the atmosphere for removing the binder. Thereafter, the laminated body is heated in the atmosphere to 940° C. to be sintered. Thereby, glass/ceramic substrate 20, in which an inductor is built-in, is obtained. Glass/ceramic substrate 20 had a thickness of about 250 μm.

Subsequently, a zinc oxide raw sheet containing ceramic powder having zinc oxide as a main component, and an organic binder is fabricated and prepared. At this time, the raw sheet had a thickness of about 30 μm.

Subsequently, a zinc oxide raw sheet with a conductor paste filled in positions connected electrically to both ends of inductor conductor 19 and internal electrodes 11D, 11E, respectively is fabricated. The zinc oxide raw sheet makes varistor layer 10F after sintering, and the conductor paste makes viahole embedded conductor 17 after sintering.

A conductor paste having silver particle as a main component is used to form a conductor layer, which will make internal electrode 11F, on the zinc oxide raw sheet with, for example, screen printing. Laminated thereon is a zinc oxide raw sheet with a conductor paste filled in positions connected electrically to both ends of inductor conductor 19 and internal electrodes 11D, 11E in the same manner as described above. The zinc oxide raw sheet makes varistor layer 10G after sintering, and the conductor paste makes viahole embedded conductor 17 after sintering.

Further, a conductor paste is used to form a conductor layer, which will make internal electrodes 11D, 11E, on the zinc oxide raw sheet with, for example, screen printing. Laminated thereon further is a zinc oxide raw sheet. The zinc oxide raw sheet makes varistor layer 10H after sintering. Thereby, a laminated body is obtained to make varistor unit 70.

Subsequently, the laminated body is stuck to glass/ceramic substrate 20 to provide a laminated body block. At this time, the laminated body is stuck so that viahole embedded conductors 17 are connected electrically to both ends of inductor conductor 19, respectively. The conductor layer had a thickness of about 2.5 μm.

According to the embodiment, a plurality of electrostatic discharge protection components are fabricated on glass/ceramic substrate 20. Therefore, printed patterns of the conductor layers have a multiplicity of configurations, shown in FIG. 7, on the glass/ceramic raw sheet and the zinc oxide raw sheet, respectively. Thereby, after being cut, a multiplicity of electrostatic discharge protection components having the configurations shown in FIG. 8 can be fabricated at a time.

Subsequently, the laminated body block is heated in the atmosphere for removing the binder. Thereafter, the laminated body block is heated in the atmosphere to 930° C. to be sintered, thus forming an integral sintered body. Thereafter, the sintered body is cut to and separated into predetermined dimensions. Thereby, it is possible to obtain a ceramic sintered body in a stage prior to formation of an electrostatic discharge protection component shown in FIGS. 7 and 8, that is, a state, in which external electrodes 15A, 15B, 15C are not formed.

Succeedingly, a conductor paste having silver particle as a main component is applied to those portions on both ends of short sides of the ceramic sintered body, to which internal electrode 11F is extended and exposed. Further, a conductor paste having silver particle as a main component is also applied to those portions on both ends of long sides, to which internal electrodes 11D, 11E, respectively, are exposed. After such application, sintering is performed at 800° C. to form external electrodes 15A, 15B, 15C. Thereby, it is possible to obtain an electrostatic discharge protection component, according to the embodiment, shown in FIGS. 7 and 8.

The electrostatic discharge protection component, according to the embodiment, as fabricated has a lengthwise dimension of about 1.0 mm, a widthwise dimension of about 0.5 mm, and a thicknesswise dimension of about 0.3 mm. An electrostatic capacity between external electrodes 15A, 15B was 1.0 pF, and varistor voltage was $V_{1\ mA}$=27 V. Likewise, an electrostatic capacity between external electrodes 15A, 15C was 1.0 pF, and varistor voltage was $V_{1\ mA}$=27 V. Further, inductance between external electrodes 15B, 15C was about 3 nH.

The electrostatic discharge protection component according to the embodiment has a π shaped filter structure, and capacitance value and inductance assume values conformed to filter calculation. Thereby, it could be confirmed that the electrostatic discharge protection component had a steep filter characteristics of three stages being resonant in the neighborhood of 3 GHz and had characteristics as a further excellent noise filter. The electrostatic discharge protection component, according to the embodiment, as fabricated is referred below to as embodiment 3.

Subsequently, an explanation will be given to results of electrostatic discharge pulse test and evaluation performed with respect to the embodiment 3 being the electrostatic discharge protection component according to the embodiment.

An evaluation method was done in the same manner as in electrostatic discharge pulse test described in the first embodiment. According to the embodiment, the embodiment 3 was used as evaluation sample 109 shown in FIG. 4, input external electrode 204 was connected to an input side of signal line 108, that is, a side of resistor 106, output external electrode 205 was connected to an output side of signal line 108, that is, a side of protected equipment 110, and external electrode 203 for grounding was connected to ground line 107. Voltage 8 kV of electrostatic discharge pulses applied by the circuit shown in FIG. 4 was applied, a peak voltage value of electrostatic discharge pulse applied to protected equipment 110 was measured, and an effect of reduction of the voltage was evaluated.

As a result, in the case where the embodiment 3 was provided, a peak voltage value applied to protected equipment 110 was about 200 V. From the above results, it was found that an effect of absorption and reduction on electrostatic discharge pulse was higher than in the embodiment 1 and the embodiment 2.

While the electrostatic discharge protection component according to the embodiment has a π shaped filter composed of one inductor and two varistors, the invention is not limited thereto. Otherwise, for example, a low-pass filter having a three or more multistage structure may be provided by providing a T shaped multistage structure, in which inductor conductor 19 of the inductor-part and internal electrodes 11D, 11E, 11F of the varistor unit are changed in structure and method of connection, and further adjusting the inductance and electrostatic capacity to appropriate values. By providing such structure, it is also possible to heighten a function as a low-pass filter.

While the first to third embodiments have been described with respect to the case where an electrostatic discharge protection component has a size of 1.0 mm×0.5 mm×0.3 mm, such size is not specifically limitative. The size may be further increased or decreased so far as a manufacturing method and strength permit.

Since the electrostatic discharge protection component according to the invention uses a substrate, such as alumina, etc., having a high strength, it possesses a sufficient strength even when a thin electrostatic discharge protection component is fabricated. Therefore, a whole thickness is not limited to a thickness described in the embodiments.

While the number of effective layers having a varistor function of the varistor unit is one in the first to third embodiments, it does not matter how many such effective layers are present. While the ceramic insulating substrate uses an alumina substrate and a glass/ceramic substrate, ferrite, high-permittivity dielectric, etc. may be used. While a conductor paste has been described with respect to the case where a silver paste is used, other conductor pastes such as a silver-palladium paste, a platinum paste, etc. may be used. The internal electrodes may be formed at an interface between the varistor unit and the ceramic insulating substrate.

While an example, in which the protective film is formed only in the second embodiment, has been described, a protective film may be formed and plating may be applied also in the first and third embodiments. With such structure, an electrostatic discharge protection component having a further excellent quality of mounting can be obtained like the electrostatic discharge protection component according to the second embodiment.

Further, a protective film may be formed and plating may be applied before or after a sintered body is cut to a predetermined dimension to be separated.

INDUSTRIAL APPLICABILITY

The electrostatic discharge protection component according to the invention is one having a very small capacitance and has no influence on the operation of even an electronic equipment, which operates at a high clock frequency, so that it is useful in the field of parts that protect a high-frequency electronic equipment from damage caused by electrostatic discharge pulse.

The invention claimed is:

1. An electrostatic discharge protection component comprising:

a ceramic insulating substrate, a varistor unit composed of a varistor layer and an internal electrode, which are sintered and integrated on the ceramic insulating substrate, and at least a pair of external electrodes provided on the varistor unit, and wherein the varistor unit is formed with a varistor, wherein a material of the varistor layer contains zinc oxide as a main component and the ceramic insulating substrate is an alumina substrate containing copper oxide having a content of 0.1% or less by weight ratio.

2. The electrostatic discharge protection component of claim 1, wherein the external electrodes are provided to be sintered and integrated on the same surface of the varistor unit.

3. The electrostatic discharge protection component of claim 1, wherein the ceramic insulating substrate is two or more times as thick as the varistor unit.

4. The electrostatic discharge protection component of claim 1, wherein a protective film is formed on an upper surface of the varistor unit except a region, in which the external electrodes are formed.

5. The electrostatic discharge protection component of claim 1, wherein the ceramic insulating substrate has a built-in inductor and the inductor is connected electrically to the varistor of the varistor unit.

6. The electrostatic discharge protection component of claim 5, wherein the varistor comprises two varistors and a πshaped filter is constructed by the varistors and the inductor.

7. The electrostatic discharge protection component of claim 5, wherein the varistor and the inductor are provided in plural to construct a multi-stage low-pass filter.

* * * * *